(12) United States Patent
Sauer

(10) Patent No.: US 11,828,302 B2
(45) Date of Patent: Nov. 28, 2023

(54) JET PUMP SPOOL VALVE

(71) Applicant: Insitu, Inc., Bingen, WA (US)

(72) Inventor: Robert Sauer, Hood River, OR (US)

(73) Assignee: INSITU, INC. (A SUBSIDIARY OF THE BOEING COMPANY), Bingen, WA (US)

( * ) Notice: Subject to any disclaimer, the term of this patent is extended or adjusted under 35 U.S.C. 154(b) by 215 days.

(21) Appl. No.: 17/521,492

(22) Filed: Nov. 8, 2021

(65) Prior Publication Data

US 2022/0196018 A1 Jun. 23, 2022

Related U.S. Application Data

(60) Provisional application No. 63/127,796, filed on Dec. 18, 2020.

(51) Int. Cl.
| | |
|---|---|
| *F04F 5/46* | (2006.01) |
| *F16K 11/07* | (2006.01) |
| *F04F 5/10* | (2006.01) |
| *F04F 5/50* | (2006.01) |
| *F04D 9/06* | (2006.01) |

(52) U.S. Cl.
CPC ............... *F04F 5/461* (2013.01); *F04D 9/06* (2013.01); *F04F 5/10* (2013.01); *F04F 5/50* (2013.01); *F16K 11/0716* (2013.01)

(58) Field of Classification Search
CPC ...... F04F 5/461; F04F 5/50; F04F 5/10; F04F 5/54; F04F 5/48; F04F 5/46; F16K 11/04; F16K 11/06; F16K 11/025; F16K 11/0716; F05D 2260/601; F02C 7/232; F02C 7/22; F02M 37/025; F02M 37/0023; Y10T 29/49236; Y10T 29/49412
USPC ................................ 417/182–184, 186–189
See application file for complete search history.

(56) References Cited

U.S. PATENT DOCUMENTS

| | | | | |
|---|---|---|---|---|
| 109,553 | A * | 11/1870 | Schriber | F04F 5/461 417/178 |
| 3,552,874 | A * | 1/1971 | Kudlaty | F04C 15/0053 415/121.2 |
| 4,592,349 | A * | 6/1986 | Bird | B05B 7/0012 417/183 |
| 6,341,623 | B1* | 1/2002 | Channing | F02M 37/0047 417/189 |
| 2003/0118455 | A1* | 6/2003 | Vilela | F04F 5/461 417/189 |

(Continued)

*Primary Examiner* — Bryan M Lettman
(74) *Attorney, Agent, or Firm* — HANLEY, FLIGHT & ZIMMERMAN

(57) ABSTRACT

A jet valve includes a valve body, a juncture operatively coupled to the valve body. The juncture having a first fluid connection fluidly coupled to a header tank and a second connection fluidly coupled to a storage tank. A spool is movably disposed within the valve body. A jet pump is fluidly coupled to a fuel pump of the header tank via a bleed line. Operation of the fuel pump pressurizes the bleed line and moves the spool to a first position to (i) close a first fluid path between the header tank and the storage tank and (ii) provide a second fluid path between the header tank and the storage tank, the second fluid path through the aperture. Depressurization of the bleed line enables the spring to move the spool to a second position to close the second fluid path and open the first fluid path.

20 Claims, 9 Drawing Sheets

(56) References Cited

U.S. PATENT DOCUMENTS

2006/0231079 A1\* 10/2006 Paluszewski ........ F02M 37/025
                                                           123/514
2021/0108579 A1\* 4/2021 Jarvo ...................... F02C 7/232

\* cited by examiner

JET PUMP SPOOL VALVE

CROSS-REFERENCE TO RELATED APPLICATION

This application claims priority to U.S. Provisional Patent Application No. 63/127,796, filed Dec. 18, 2020. The entirety of U.S. Provisional Patent Application No. 63/127,796 is hereby incorporated by reference herein.

FIELD OF THE DISCLOSURE

This disclosure relates generally to valves and, more particularly, to a jet pump spool valve.

BACKGROUND

Aircraft typically implement a fuel system with multiple fuel tanks for storing fuel. The tanks can include a storage tank and a header tank, which can be positioned above the storage tank. In other cases, the header tank can be positioned below the storage tank. Some known fuel systems implement a pump to move fuel from the storage tank to the header tank. During operation, a vapor bubble may be formed in the header tank as a result of exposure of the aircraft to certain temperatures and pressures, design of the pump, relative height difference between the header tank and the storage tank, entrained air in the fuel, and/or restrictions along a fuel line.

SUMMARY

An example jet valve to control flow of a fluid therethrough is disclosed herein. In various examples, the jet valve may be an integrated jet valve. The example jet valve disclosed herein includes a valve body and a juncture operatively coupled to the valve body. The juncture has a first fluid connection fluidly coupled to a header tank and a second connection fluidly coupled to a storage tank. A spool is movably disposed within the valve body. The spool has an aperture extending longitudinally therethrough. A spring is operatively coupled between the spool and the valve body, and a jet pump is fluidly coupled to a fuel pump of the header tank via a bleed line. The jet pump is disposed within the aperture, where operation of the fuel pump pressurizes the bleed line and moves the spool to a first position to (i) close a first fluid path between the header tank and the storage tank and (ii) provide a second fluid path between the header tank and the storage tank, the second fluid path through the aperture, and depressurization of the bleed line enables the spring to move the spool to a second position to close the second fluid path and open the first fluid path.

An example system to control flow of a fluid therethrough is disclosed herein. The example system disclosed herein includes a storage tank and a header tank. The header tank is fluidly coupled to the storage tank, and an integrated jet valve is fluidly coupled between the storage tank and the header tank. The integrated jet valve is fluidly coupled to a fuel pump of the header tank via a bleed line. The integrated jet valve includes a valve body and a juncture operatively coupled to the valve body. The juncture has a first fluid connection fluidly coupled to a header tank and a second connection fluidly coupled to a storage tank. A spool is movably disposed within the valve body. The spool has an aperture extending longitudinally therethrough. A spring is operatively coupled between the spool and the valve body, and a jet pump is fluidly coupled to a fuel pump of the header tank via a bleed line. The jet pump is disposed within the aperture, where operation of the fuel pump pressurizes the bleed line and moves the spool to a first position to (i) close a first fluid path between the header tank and the storage tank and (ii) provide a second fluid path between the header tank and the storage tank, the second fluid path through the aperture, and depressurization of the bleed line enables the spring to move the spool to a second position to close the second fluid path and open the first fluid path.

An example method of producing a system for controlling flow of a fluid therethrough is disclosed herein. The example method disclosed herein includes fluidly coupling a storage tank to a header tank, fluidly coupling a jet valve between the storage tank and the header tank, and fluidly coupling the jet valve to a fuel pump of the header tank via a bleed line. The jet valve includes a valve body and a juncture operatively coupled to the valve body. The juncture has a first fluid connection fluidly coupled to a header tank and a second connection fluidly coupled to a storage tank. A spool is movably disposed within the valve body. The spool has an aperture extending longitudinally therethrough. A spring is operatively coupled between the spool and the valve body, and a jet pump is fluidly coupled to a fuel pump of the header tank via a bleed line. The jet pump is disposed within the aperture, where operation of the fuel pump pressurizes the bleed line and moves the spool to a first position to (i) close a first fluid path between the header tank and the storage tank and (ii) provide a second fluid path between the header tank and the storage tank, the second fluid path through the aperture, and depressurization of the bleed line enables the spring to move the spool to a second position to close the second fluid path and open the first fluid path.

Figure 1:
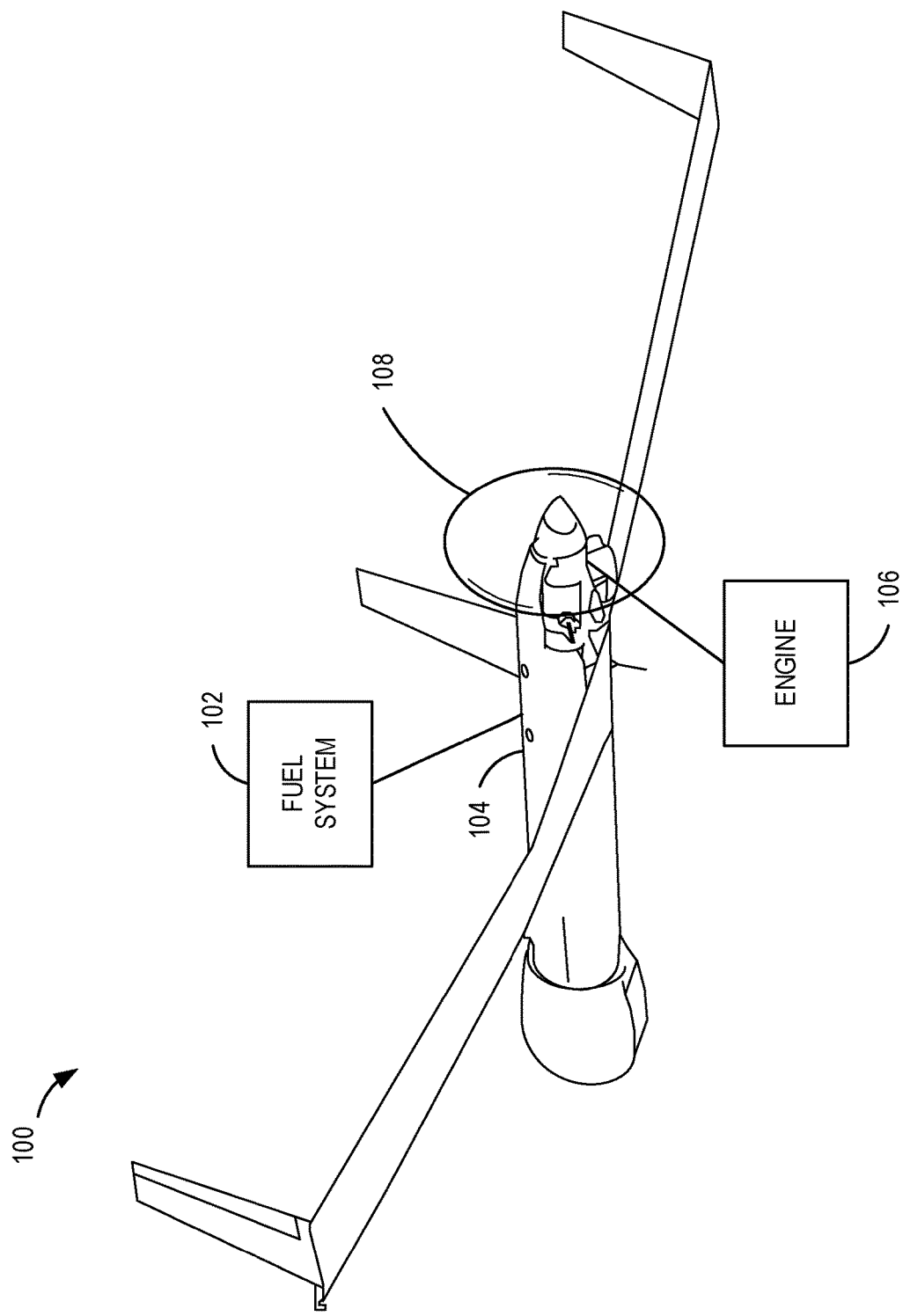
FIG. 1 illustrates an example aircraft in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A jet pump spool valve is disclosed. Aircraft often implement fuel systems including a storage tank and a header tank for storing fluid (e.g., fuel). The header tank and the storage tank are fluidly coupled together via a main line (e.g., pipe, tube, conduit), which enables the fluid to flow therebetween. The header tank is positioned above the storage tank (in a vertical direction with respect to gravity). In other cases, the header tank is positioned below the storage tank. A fuel pump can be submerged inside the header tank at a bottom of the header tank and pumps fluid from the header tank towards an injector of the aircraft. During operation, the fuel pump generates suction that causes fluid from the storage tank to flow to the header tank, thereby replacing a volume of the fluid pumped out from the header tank. As such, the header tank can remain filled with fluid during operation of the fuel pump to ensure proper functioning of the fuel system.

During flight at relatively high altitudes (e.g., above 5,000 feet), aircraft experience relatively low pressures. Furthermore, during fueling of the aircraft, fluid is typically introduced to the header tank and the storage tank at a relatively high temperature. As a result of the relatively low pressure and relatively high temperature conditions during flight, the fluid in the header tank can boil and/or evaporate. In such cases, a vapor bubble can be formed at the top of the header tank, and a size of the vapor bubble may continually increase during boiling of the fluid. In particular, the vapor bubble may be formed as a result of exposure of the aircraft to certain temperatures and pressures, design of the fuel pump, relative height difference between the header tank and the storage tank, entrained air in the fuel, and/or restrictions along a fuel line. The size of the vapor bubble can increase and cause the vapor bubble to contact the main line. As a result, the vapor bubble can disrupt a suction of fluid from the storage tank and the fuel pump may cavitate, thereby causing premature wear of the fuel pump.

Some known fuel systems implement a jet pump on the main line between the storage tank and the header tank to prevent cavitation. This jet pump can direct high pressure fluid from the fuel pump and low pressure fluid from the storage tank towards the header tank. The fluids being provided to the header tank can result in a pressure increase in the header tank, thereby forcing vapor out from the header tank and towards the storage tank via a vent line. As such, the jet pump can prevent formation of the vapor bubble in the header tank.

During fueling, fluid provided to the header tank can further flow to the storage tank via the main line and, thus, via the jet pump. Conversely, during defueling, fluid from the storage tank is pulled through the main line using suction. However, because the jet pump restricts the flow of fluid therein, the jet pump can reduce a flow rate of the fluid and, thus, an efficiency of fueling and/or defueling. Accordingly, some fuel systems implement a bypass line between the header tank and the storage tank separate from the main line. In such fuel systems, the bypass line can be used instead of the main line for fueling and/or defueling of the header tank and the storage tank. However, implementing the bypass line separate from the main line increases weight of and/or space required by the fuel system.

Examples disclosed herein implement a jet valve (e.g., an integrated jet pump spool valve, an integrated jet valve) on a main line fluidly coupling the header tank and the storage tank. The example jet valve includes a valve body and a juncture operatively coupled to the valve body. The jet valve further includes a spool (e.g., shaft, a slidable shaft, etc.) and a valve plug coupled at an end of the spool. A first aperture (e.g., a first opening) extends longitudinally through the spool and the valve plug, and a jet pump is implemented within the first aperture. Furthermore, a spring is operatively coupled between the spool and the valve body. The jet pump is fluidly coupled to the fuel pump of the header tank via a bleed line. When the jet valve is in an open position, the jet valve provides a first fluid path between the header tank and the storage tank through the juncture. During operation of the fuel pump, high pressure fluid from the fuel pump moves the jet valve from the open position to a closed position in which the valve plug closes the first fluid path (e.g., prevents or substantially reduces fluid flow along the first fluid path).

When the jet valve is in the closed position, the jet valve provides a second fluid path from the storage tank to the header tank via the first aperture of the spool. For example, fluid from the storage tank enters the first aperture via a second aperture extending through the spool in a transverse direction. In such examples, the jet pump mixes the high pressure fluid from the bleed line with the fluid from the storage tank, then expels the mixture of fluids towards the header tank at a relatively high pressure. As such, the mixture of fluids expelled from the jet valve can increase the pressure inside the header tank, thereby enabling the vapor from the header tank to be vented to the storage tank via the vent line.

In some examples, when the high pressure fluid entering the jet pump via the bleed line is below a threshold pressure, the spring returns the jet valve to the open position. Fluid from the storage tank does not pass through the jet pump when the jet valve is in the open position. As such, the jet valve in the open position allows for efficient fueling and/or defueling of the header tank and the storage tank, and the jet valve in the closed position can increase the pressure inside the header tank to enable venting of the header tank. In such examples, fueling and/or defueling can occur along the main line between the header tank and the storage tank. Advantageously, the example jet valve disclosed herein eliminates the need for a bleed line separate from the main line for fueling and/or defueling, thus reducing a weight, size, and/or number of components of the fuel system.

FIG. 1 illustrates an example aircraft 100 in which examples disclosed herein may be implemented. In the illustrated view of FIG. 1, the aircraft 100 is implemented as a fixed wing aircraft. In some examples, the aircraft 100 can be an unmanned aerial vehicle (UAV). The example aircraft 100 includes an example fuel system 102 implemented on an example fuselage 104 of the aircraft 100. The fuel system 102 is operatively coupled to an example engine 106 of the aircraft 100. In this example, the engine 106 moves an example propeller 108. To this end, the fuel system 102 provides fuel to at least one injector of the engine 106 during operation of the aircraft 100. In some examples, the fuel system 102 stores and/or transfers the fuel between one or more storage tanks.

Figure 2:
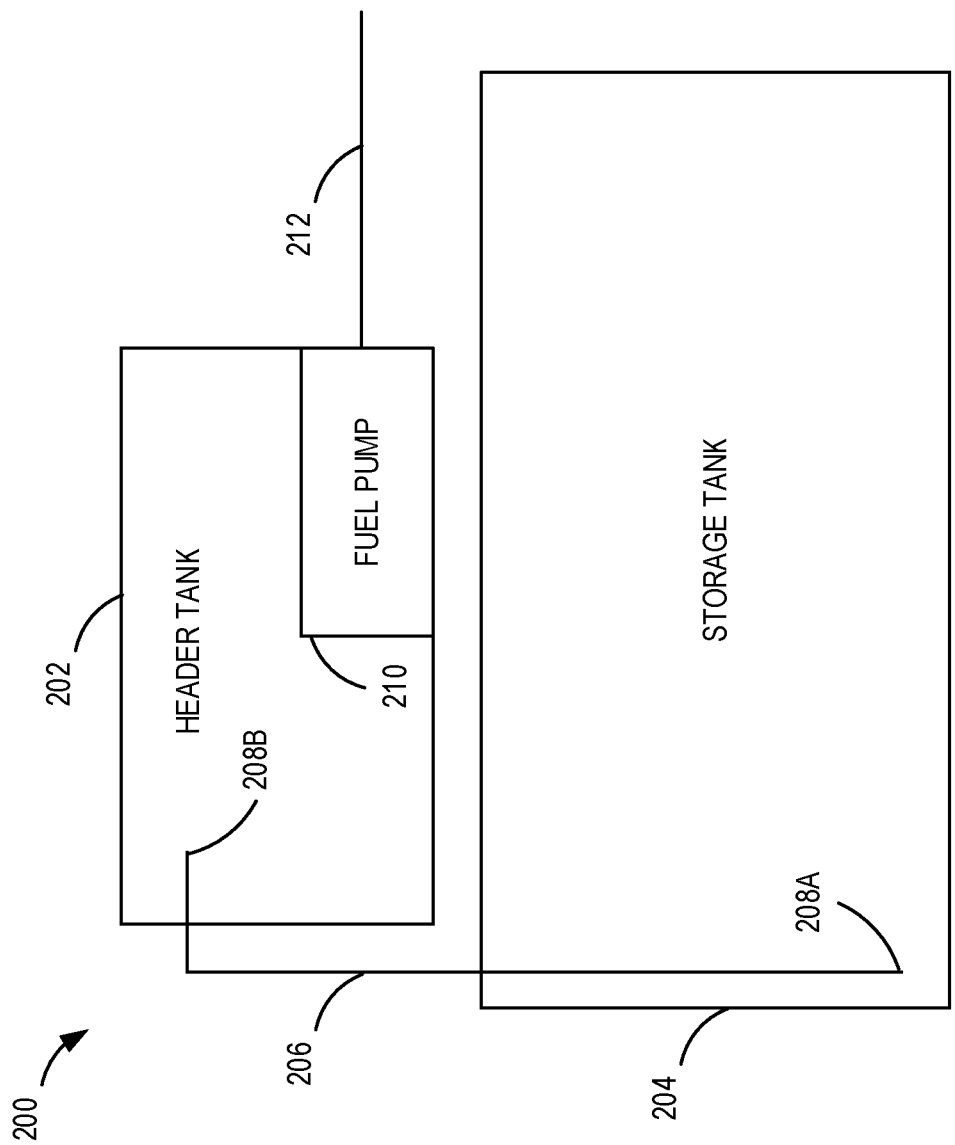
FIG. 2 is a schematic overview of a known aircraft fuel system.

FIG. 2 is a schematic overview of a known aircraft fuel system 200. In the illustrated example of FIG. 2, the known fuel system 200 includes a header tank 202 fluidly coupled to a storage tank 204 via a main line 206. The header tank 202 and the storage tank 204 can be any type of container for storing fluids (e.g., fuel, water, gas, etc.). Furthermore, the main line 206 is a conduit (e.g., pipe, tube, etc.) in which fluid flows therethrough. In this example, a first end 208A of the main line 206 is positioned proximate a bottom of the storage tank 204, and a second end 208B of the main line 206 is positioned proximate a top of the header tank 202. A fuel pump 210 is submerged in the header tank 202 at a bottom of the header tank 202. The fuel pump 210 pumps fluid (e.g., fuel) from the header tank 202 to one or more components of the aircraft 100 (e.g., the engine 106 of FIG. 1) via a high pressure fuel line 212.

In the illustrated example of FIG. 2, the header tank 202 is positioned above the storage tank 204, such that a vertical position of the header tank 202 is higher (in the view of FIG. 2) than a vertical position of the storage tank 204. In other examples, the header tank 202 is positioned below the storage tank 204. During fueling of the fuel system 200, fluid is provided to the header tank 202. As a result of the relatively higher position of the header tank 202, gravity causes fluid in the header tank 202 to flow downward (in the view of FIG. 2) through the main line 206 and to the storage tank 204 during fueling. Conversely, during defueling of the fuel system 200, suction applied to the header tank 202 can pull the fluid from the storage tank 204 upward though the main line 206 to the header tank 202. In this known implementation, a size (e.g., volume) of the storage tank 204 is greater than a corresponding size of the header tank 202. As such, a static pressure inside the header tank 202 can be more easily maintained as a result of the relatively smaller size of the header tank 202. Furthermore, the storage tank 204 can store excess fuel not currently being used to maintain the static pressure in the header tank 202, and the excess fuel can be provided to the header tank 202 upon fluid exiting the header tank 202.

In this example, the fuel pump 210 is a centrifugal pump. In other examples, however, the fuel pump 210 can be implemented as a positive displacement pump, or any other suitable type of pump. During operation of the fuel pump 210, the fuel pump 210 pressurizes fluid in the header tank 202 and expels the fluid out of the header tank 202 via the high pressure fuel line 212. For example, pressurized fluid in the high pressure fuel line 212 can be directed to an injector (e.g., a fuel injector) of the engine 106. When the fuel pump 210 expels a volume of fluid from the header tank 202, suction generated by the fuel pump 210 pulls a similar volume of fluid from the storage tank 204 (e.g., to replace the fluid expelled from the header tank 202). Accordingly, the fuel pump 210 continually expels and refills the fluid in the header tank 202 to maintain the static pressure in the header tank 202.

The fluid provided to the header tank 202 and, thus, the storage tank 204 during fueling is at a relatively high temperature. Furthermore, during flight of the aircraft 100 at relatively high altitudes, the aircraft 100 may operate in relatively low pressures. Accordingly, as a result of the high temperature of the fluid in combination with the relatively low pressure surrounding the fluid, the fluid in the header tank 202 can boil and/or evaporate. In turn, vapor generated during boiling and/or evaporation of the fluid may form a vapor bubble in the header tank 202, where a buoyant force causes the vapor bubble to move to the top of the header tank 202. The vapor bubble may continually increase in size such that the vapor bubble comes in contact with the second end 208B of the main line 206, thereby disrupting the suction generated by the fuel pump 210. In such cases, cavitation and/or premature wear of the fuel pump 210 may result. Accordingly, in some cases, the known fuel system 200 implements additional components to expel the vapor from the header tank 202 and, thus, prevent cavitation of the fuel pump 210.

Figure 3:
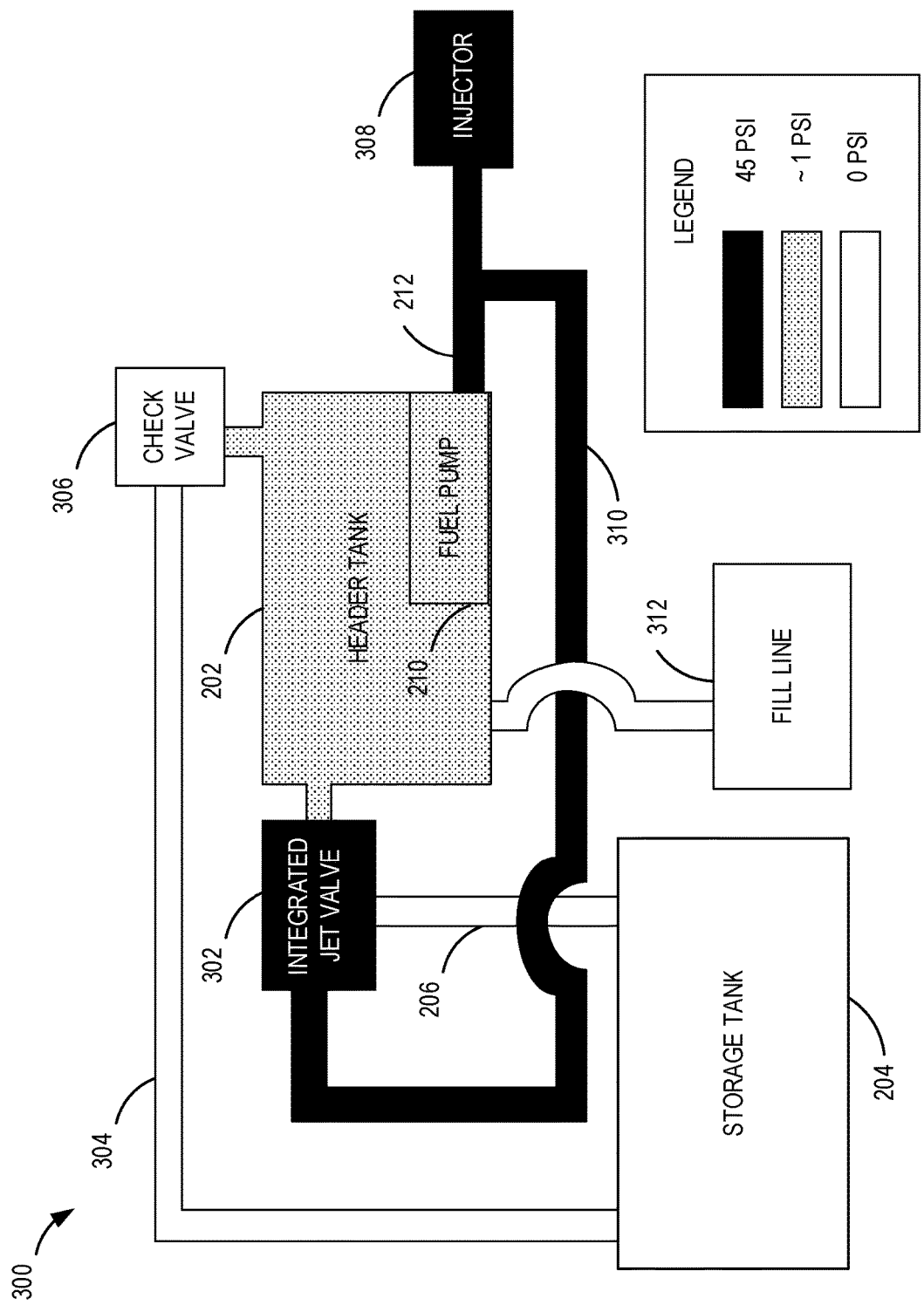
FIG. 3 is a schematic overview of an example fuel system implementing an example jet valve in accordance with teachings of this disclosure.

FIG. 3 is a schematic overview of an example fuel system 300 implementing an example jet valve (e.g., an integrated jet pump spool valve, an integrated jet valve) 302 in accordance with teachings of this disclosure. The example fuel system 300 of FIG. 3 is similar to the known fuel system 200 of FIG. 2, but the example fuel system 300 implements additional components (e.g., including the jet valve 302) for expelling vapor from the header tank 202. In the illustrated example of FIG. 3, for example, the fuel system 300 includes the header tank 202, the storage tank 204, the main line 206, the fuel pump 210, and the high pressure fuel line 212 of FIG. 2. The fuel system 300 further includes an example vent line 304 fluidly coupled between the header tank 202 and the storage tank 204, an example check valve 306 implemented on the vent line 304, an example injector (e.g., a fuel injector) 308 fluidly coupled to the high pressure fuel line 212, an example bleed line 310 fluidly coupled between the fuel pump 210 and the jet valve 302, and an example fill line 312 fluidly coupled to the header tank 202.

In the illustrated example of FIG. 3, the fuel pump 210 pumps fluid from the header tank 202. In particular, during operation of the fuel pump 210, fluid exits the fuel pump 210 at a relatively high pressure (e.g., 45 pounds per square inch (psi)) compared to a static pressure inside the header tank 202, then flows to the injector 308 via the high pressure fuel line 212. In some examples, the injector 308 controls flow of the high pressure fluid to the engine 106 of FIG. 1 to control combustion in one or more pistons of the engine 106. In the illustrated example of FIG. 3, a portion of the high pressure fluid from the fuel pump 210 does not flow to the injector 308 and, instead, flows through the bleed line 310 towards the jet valve 302. In this example, the high pressure fluid applies pressure on the jet valve 302 to control a position of the jet valve 302. For example, the jet valve 302 moves to a closed position when the pressure is at or above a threshold pressure. In some such examples, the threshold pressure is 45 psi. However, any other suitable threshold pressure may be implemented instead.

When the jet valve 302 is in the closed position, the jet valve 302 closes a first fluid path between the header tank 202 and the storage tank 204. Furthermore, the jet valve 302 in the closed position causes suction of fluid from the storage tank 204. In such examples, the fluid in the storage tank 204 is at a relatively low pressure (e.g., 0 psi). In turn, the suction causes the fluid from the storage tank 204 to flow upward (in the view of FIG. 3) through the main line 206 and into the jet valve 302. As a result, the fluid from the storage tank 204 mixes with the high pressure fluid entering the jet valve 302 from the fuel pump 210. The jet valve 302 increases a pressure of the fluids by restricting flow of the fluids through a second fluid path narrower than the first fluid path, then expels the pressurized fluids to the header tank 202. Introduction of the pressurized fluids increases a static pressure inside the header tank 202, such that the static pressure inside the header tank 202 (e.g., approximately 1 psi) is greater than the static pressure inside the storage tank 204 (e.g., 0 psi).

As described above in connection with FIG. 2, vapor can be produced in the header tank 202 when high temperature and low pressure conditions cause the fluid in the header tank 202 to boil and/or evaporate. However, in the illustrated example of FIG. 3, the pressurized fluid provided to the header tank 202 by the jet valve 302 increases the static pressure in the header tank 202, thereby causing the vapor to be expelled from the top of the header tank 202. For example, the increased static pressure forces the vapor to exit via the check valve 306 and flow through the vent line 304. The example check valve 306 ensures unidirectional flow of vapor and/or fluid from the header tank 202, and, thus, prevents the vapor and/or fluid in the vent line 304 from reentering the header tank 202. In this example, the vapor flows through the vent line 304 towards the storage tank 204. In other examples, the vapor can be vented to the atmosphere. By enabling venting of the vapor from the header tank 202, the fuel system 300 implementing the jet valve 302 can prevent cavitation and, thus, prevent premature wear of the fuel pump 210, thereby increasing a service life thereof.

When the pressure inside the bleed line 310 is below the pressure threshold (e.g., in response to the fuel pump 210 being shut off), the jet valve 302 moves to an open position in which the header tank 202 and the storage tank 204 are fluidly coupled via the first fluid path. The first fluid path has a relatively large cross-sectional area in comparison to the second flow path through the jet valve 302. As such, a flow rate of the fluid through the jet valve 302 is greater when the jet valve 302 is in the open position (i.e., compared to when the jet valve 302 is in the closed position).

In some examples, fueling and/or defueling of the header tank 202 and the storage tank 204 can be performed while the fuel pump 210 is shut off and/or the jet valve 302 is in the open position. For example, during fueling, fluid is provided to the header tank 202 via the fill line 312, and the fluid can flow from the header tank 202 to the storage tank 204 via the main line 206. Conversely, during defueling, suction is applied to the fill line 312. The suction pulls fluid from the storage tank 204 upward through the main line 206 and to the header tank 202, and further pulls the fluid from the header tank 202 through the fill line 312. As a result of the jet valve 302 being in the open position, fueling and/or defueling of the fuel system 300 may occur without restriction of fluid flow by the jet valve 302.

Figure 4:
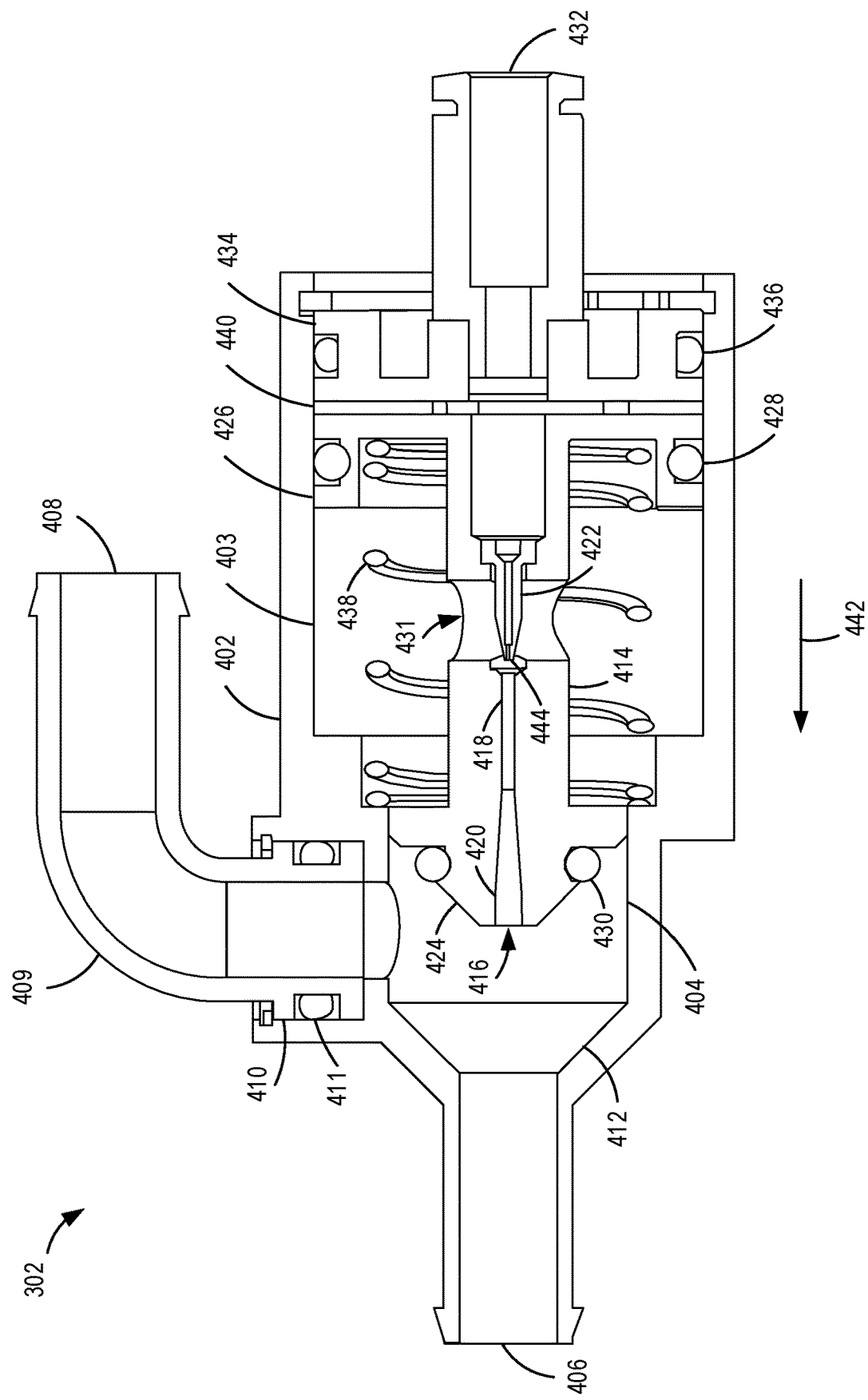
FIG. 4 is a cross-sectional view of the example jet valve of FIG. 3.

FIG. 4 is a cross-sectional view of the example jet valve 302 of FIG. 3. In the illustrated example of FIG. 4, the jet valve 302 includes an example valve body 402, which defines an example chamber 403, and an example juncture 404 operatively coupled to the valve body 402. The juncture 404 includes an example first connection 406 fluidly coupled to the header tank 202 and an example second connection 408 fluidly coupled to the storage tank 204 via the main line 206. In this example, the second connection 408 includes a curved section 409, which is implemented as a 90-degree elbow in this example. In other examples, the second connection 408 does not include the curved section 409 (e.g., the second connection 408 is substantially straight). In this example, the second connection 408 is coupled to the valve body 402 at an example first flanged section 410. For example, the first flanged section 410 can be coupled and/or bolted to the valve body 402. Accordingly, the first flanged section 410 can include an example first seal 411 circumscribing the first flanged section 410.

In this example, the first connection 406 and the second connection 408 have a circular and/or elliptical cross-sectional shape. In other examples, the first connection 406 and the second connection 408 can have different cross-sectional shapes such as, but not limited to, rectangular cross-sectional shapes, star-shaped cross-sectional shapes, triangular shaped cross-sectional sections, etc. In this example, a cross-sectional area is substantially the same between the first connection 406 and the second connection 408. In other examples, the cross-sectional area of the first connection 406 can be larger or smaller than the corresponding cross-sectional area of the second connection 408. The juncture 404 includes an example tapered section (e.g., a tapered receptacle) 412 proximate the first connection 406, at which a cross-sectional area of the juncture 404 gradually decreases toward the first connection 406.

In the illustrated example of FIG. 4, the jet valve 302 further includes an example spool 414 disposed in the valve body 402, where the spool 414 is slidably movable within the chamber 403. The spool 414 of the illustrated example includes a first aperture (e.g., a first opening) 416 extending longitudinally therethrough. An example throat 418 and an example diffuser 420 define a first portion of the first aperture 416, and an example jet pump 422 is disposed in a second portion of the first aperture 416. In this example, a cross-sectional area of the throat 418 is constant along a length of the throat 418. Conversely, a cross-sectional area of the diffuser 420 gradually increases along a length of the diffuser 420 from the throat 418 to the front end of the spool 414. For example, the cross-sectional area of the diffuser 420 at the throat 418 is substantially similar to the cross-sectional area of the throat 418, and the cross-sectional area of the diffuser 420 at the front end of the spool 414 is greater than (e.g., double) the cross-sectional area of the throat 418.

In this example, the spool includes an example plug 424 at a first end of the spool 414, and an example second flanged section 426 at a second end of the spool 414, where the first end is opposite the second end. The plug 424 and the second flanged section 426 are surrounded (e.g., diametrically surrounded) by and slidably movable relative to the valve body 402. The plug 424 has substantially the same shape (e.g., tapered shape) as the tapered section 412 of the juncture 404. In this example, an example second seal 428 circumscribes the second flanged section 426, and an example third seal 430 surrounds the plug 424. Furthermore, the spool 414 has an example second aperture (e.g., a second opening) 431 extending laterally therethrough and intersecting the first aperture 416, such that the second aperture 431 is in fluid communication with the first aperture 416. In this example, the jet pump 422 is disposed within an intersection of the first and second apertures 416, 431.

In the illustrated example of FIG. 4, the jet valve 302 includes an example high pressure connection 432. The high pressure connection 432 includes an example third flanged section 434 fixedly coupled to the valve body 402, where an example fourth seal 436 surrounds the third flanged section 434. Furthermore, the high pressure connection 432 is fluidly coupled to the fuel pump 210 via the bleed line 310 of FIG. 3, and further fluidly coupled to the jet pump 422 via the first aperture 416. As such, high pressure fluid can enter the jet valve 302 via the high pressure connection 432, then flow towards the juncture 404 through the jet pump 422, the throat 418, and the diffuser 420.

In the illustrated example of FIG. 4, an example spring 438 is disposed in the chamber 403 of the valve body 402 and operatively coupled between the second flanged section 426 of the spool 414 and an inner surface of the valve body 402. In this example, the spring 438 wraps around the spool 414, and the jet valve 302 is shown in an open position. When the jet valve 302 is in the open position, a spring force of the spring 438 pushes on the second flanged section 426 such that the spool 414 is positioned proximate the third flanged section 434. As such, a gap 440 between the second flanged section 426 and the third flanged section 434 is relatively small. Furthermore, when the jet valve 302 is in the open position, the header tank 202 and the storage tank 204 are fluidly coupled such that fluid can flow therebetween along a first fluid path. In such examples, the plug 424 prevents the fluid from flowing to the chamber 403, as well as to the first and second apertures 416, 431.

In some examples, when high pressure fluid enters the high pressure connection 432 (e.g., during operation of the fuel pump 210), the high pressure fluid generates pressure in the jet pump 422 in an example forward direction 442. In some such examples, when the pressure from the high pressure fluid is at or above a threshold pressure, the pressure in the forward direction 442 overcomes the force of the spring 438 (e.g., acting in a direction opposite the forward direction 442). In such examples, the spool 414 can move in the forward direction 442. The jet valve 302 is in a closed position when the spool 414 moves forward such that the plug 424 is sealably disposed in the tapered section 412 of the juncture 404. In such examples, the third seal 430 prevents fluid from flowing along the first fluid path through the juncture 404.

Furthermore, when the jet valve 302 is in the closed position, fluid from the second connection 408 can flow to the chamber 403 and into the second aperture 431. The fluid mixes with the fluid exiting an example nozzle 444 of the jet pump 422, and the jet pump 422 expels the mixture of fluids at a relatively high velocity though the throat 418 and towards the diffuser 420. As the mixture of fluids then flows through the diffuser 420, the gradually increasing cross-sectional area of the diffuser 420 allows the mixture of fluids to expand and, thus, decelerate and increase in pressure. As a result, the mixture of fluids exits the diffuser 420 at a relatively high pressure and flows toward the header tank 202 via the first connection 406.

Figure 5:
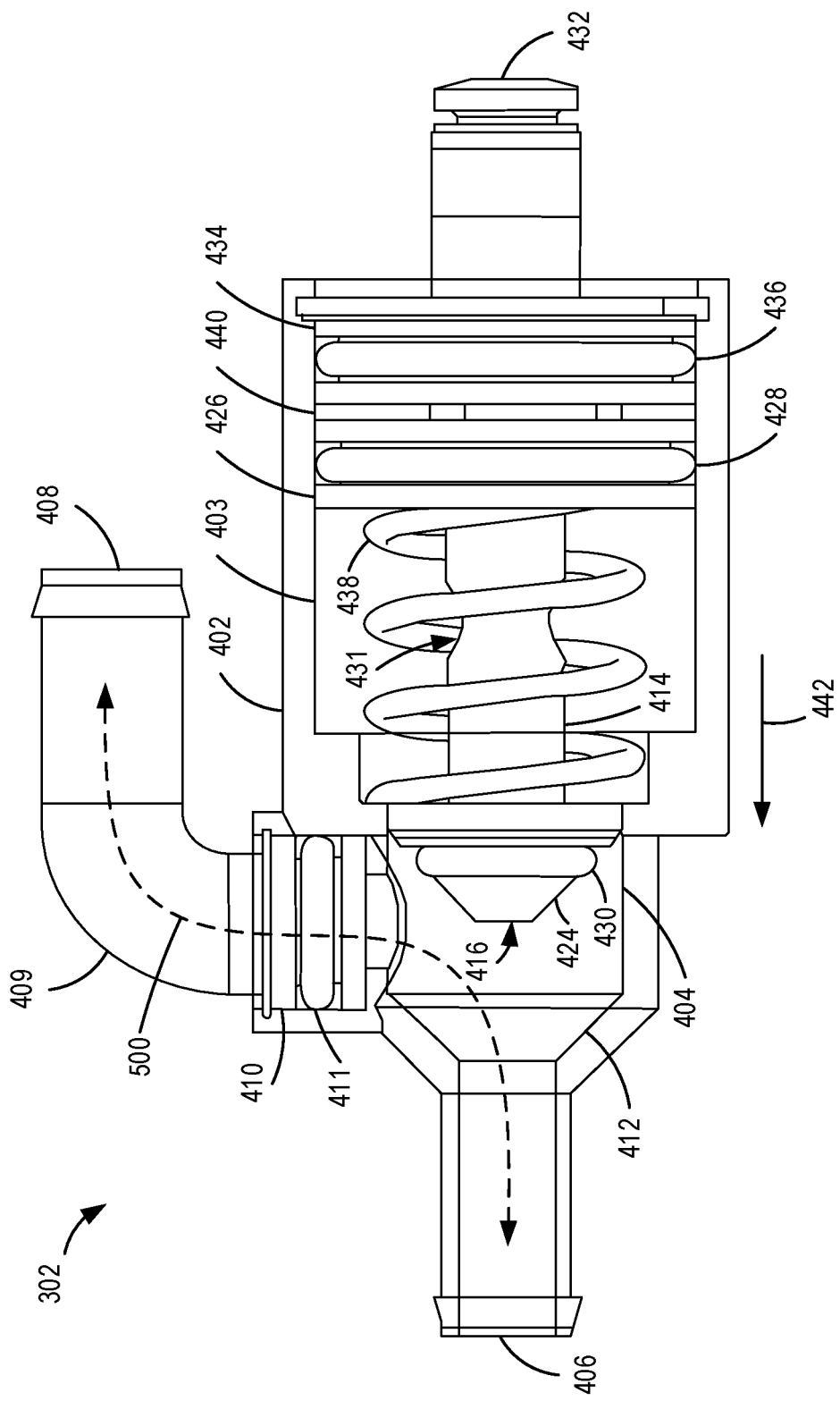
FIG. 5 is a partial view of the example jet valve of FIG. 4 in an open position.

FIG. 5 is a partial view of the jet valve 302 of FIG. 4 in an open position. In this example, the jet valve 302 is in the open position during fueling and/or defueling. In particular, the fuel pump 210 of FIG. 3 is shut off, and high pressure fluid does not flow to the high pressure connection 432. As such, pressure in the high pressure connection 432 is below the threshold pressure. In some examples, the force of the spring 438 acts on the second flanged section 426 to move the spool 414 opposite the forward direction 442 to a position proximate the third flanged section 434. Accordingly, the spring 438 can maintain the spool 414 in the open position while the pressure in the high pressure connection 432 is below the threshold pressure.

In the illustrated example of FIG. 5, the threshold pressure is 45 psi. However, in other examples, the threshold pressure may differ based on design and/or application needs. In some examples, the threshold pressure corresponds to and/or is adjusted based on a spring constant of the spring 438. For example, implementing a spring with a relatively high spring constant can increase the threshold pressure, and implementing a spring with a relatively low spring constant can decrease the threshold pressure. Advantageously, the spring 438 can be selected based on a desired threshold pressure in the fuel system 300 of FIG. 3. For example, the desired threshold pressure may correspond to an operating pressure of the fuel pump 210.

During defueling, suction is applied to the fill line 312 of FIG. 3. The applied suction pulls fluid from the storage tank 204 through the jet valve 302 and toward the header tank 202. In some examples, the suction can be sufficiently strong to pull the spool 414 in the forward direction 442. In some such examples, the jet valve 302 can unintentionally and/or undesirably move to the closed position during defueling. As such, in addition to selecting the spring 438 based on the desired threshold pressure, the spring 438 requires a sufficiently high spring constant to prevent movement of the spool 414 under suction.

When the jet valve 302 is in the open position shown in FIG. 5, fluid can flow between the header tank 202 and the storage tank 204 of FIG. 3 along an example first fluid path 500. For example, the first fluid path 500 flows between the first connection 406 and the second connection 408 via the juncture 404. As a result of a relatively large cross-sectional area along the first fluid path 500, fluid can flow along the first fluid path 500 at a relatively high flow rate and/or without significant pressure change. Advantageously, fueling and/or defueling of the header tank 202 and the storage tank 204 can be performed more efficiently when the jet valve 302 is in the open position (e.g., compared to the closed position).

Figure 6:
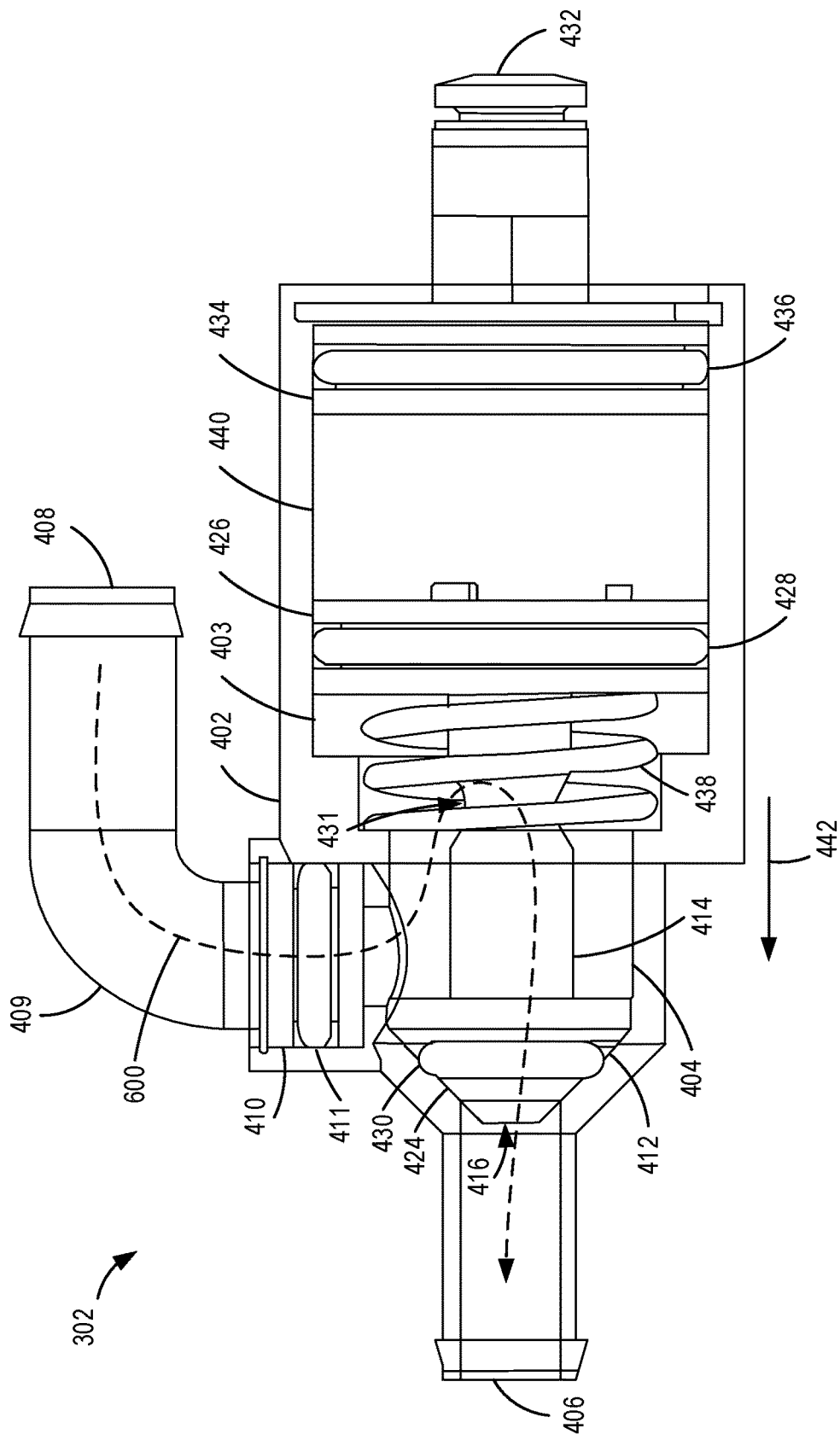
FIG. 6 is a partial view of the example jet valve of FIGS. 4 and 5 in a closed position.

FIG. 6 is a partial view of the jet valve 302 of FIGS. 4 and/or 5 in a closed position. In some examples, the jet valve 302 in the closed position provides fluid from the storage tank 204 and from the fuel pump 210 to the header tank 202 of FIG. 3. In such examples, the fluid increases a static pressure in the header tank 202 and, thus, enables venting of vapor from the header tank 202 to prevent cavitation of the fuel pump 210. In the illustrated example of FIG. 6, during operation of the fuel pump 210, high pressure fluid flows from the fuel pump 210 and enters the jet valve 302 via the high pressure connection 432. In this example, the high pressure fluid is at or above the threshold pressure (e.g., 45 psi).

In the illustrated example of FIG. 6, the high pressure fluid enters the chamber 403 in the gap 440 between the second flanged section 426 and the third flanged section 434. In such examples, the second seal 428 prevents the high pressure fluid in the gap 440 from flowing through an interface between the second flanged section 426 and the valve body 402. Instead, the high pressure fluid enters an inlet of the jet pump 422. In this example, the high pressure fluid generates pressure in the jet pump 422 in the forward direction 442.

In the illustrated example, the pressure in the jet pump 422 is at or above the threshold pressure, such that the pressure in the forward direction 442 is greater than a force of the spring 438. As such, the spool 414 compresses the spring 438 and moves to the closed position. In this example, the plug 424 of the spool 414 engages the tapered section 412 of the juncture 404. In particular, the third seal 430 sealably engages the tapered section 412 to prevent fluid from flowing between the first connection 406 and the second connection 408 along the first fluid path 500 of FIG. 5.

When the jet valve 302 is in the closed position as shown in FIG. 6, the jet valve 302 provides an example second fluid path 600 from the second connection 408 to the first connection 406, where the second fluid path 600 is different from the first fluid path 500. For example, when the high pressure fluid flows through the jet pump 422, the jet pump 422 generates suction that causes low pressure (e.g., 0 psi) fluid from the storage tank 204 to flow towards the jet pump 422 via the second connection 408. In such examples, the low pressure fluid flows into the chamber 403 and enters the spool 414 via the second aperture 431. At an intersection between the first aperture 416 and the second aperture 431, the low pressure fluid from the storage tank 204 mixes with the high pressure fluid from the fuel pump 210. In such examples, the jet pump 422 expels the fluids from the spool 414 via the first aperture 216, where the fluids are pressurized (e.g., around 1 psi) upon exiting the first aperture 216. The pressurized fluids flow towards the header tank 202 via the first connection 406, and can increase the static pressure inside the header tank 202.

Advantageously, the jet valve 302 can move between the open position in FIG. 5 and the closed position in FIG. 6 based on the pressure of fluid entering the high pressure connection 432. In some examples, the pressure depends on whether the fuel pump 210 is operating. For example, the jet valve 302 moves to the open position when the fuel pump 210 is shut off and/or the pressure is below the pressure threshold. Conversely, the jet valve 302 moves to the closed position when the fuel pump 210 is operating and/or the pressure is at or above the pressure threshold. In particular, the jet valve 302 can move between the open position and the closed position without actuation and/or intervention by an operator. As such, the jet valve 302 passively adjusts for fueling and/or defueling of the fuel system 300 when the fuel pump 210 is shut off, and pressurizes the header tank 202 to vent vapor therefrom when the fuel pump 210 is operating.

Figure 7:
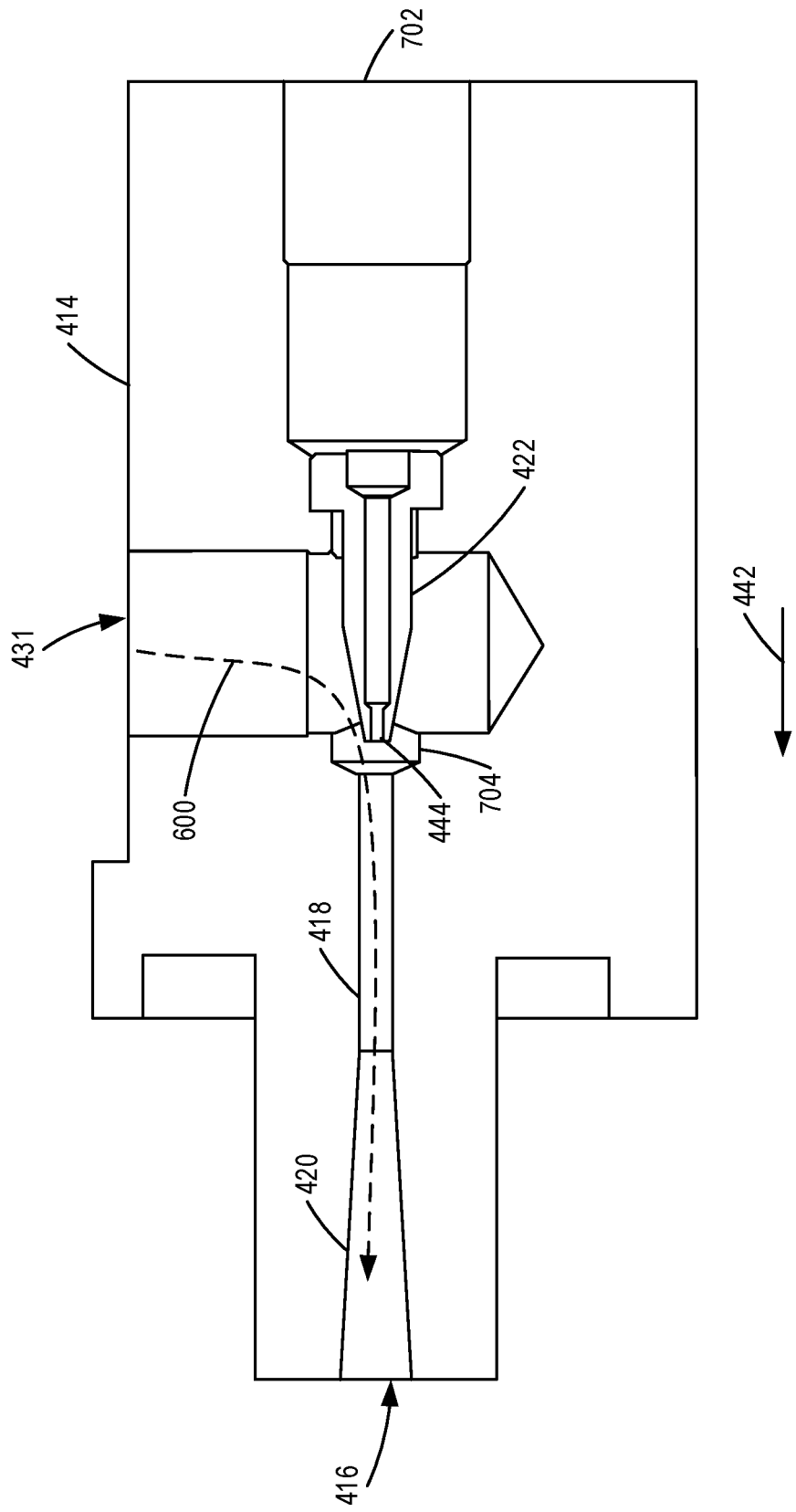
FIG. 7 is a partial cutaway view of the example jet valve of FIGS. 4, 5, and 6 in the closed position.

FIG. 7 is a partial cutaway view of the jet valve 302 of FIGS. 4, 5, and 6 in the closed position. In the illustrated example of FIG. 7, power fluid from the fuel pump 210 of FIG. 3 enters the jet pump 422 via an example pump inlet 702. In some examples, the power fluid flows from the high pressure connection 432 of FIG. 4. Upon entering the pump inlet 702, the power fluid has a relatively high pressure and a relatively low velocity. As the power fluid flows through the nozzle 444 of the jet pump 422, a gradually decreasing cross-sectional area of the nozzle 444 restricts a flow area of the power fluid, such that the power fluid then has a relatively low pressure and a relatively high velocity upon being expelled from the nozzle 444. In some examples, a pressure drop is then generated below the nozzle 444. In turn, the pressure drop generates suction inside the second connection 408 of FIG. 4, thereby causing reservoir fluid to be pulled from the storage tank 204 and flow through the second aperture 431 along the second fluid path 600.

In this example, the reservoir fluid from the storage tank 204 flows into an example inlet chamber 704 in front of the nozzle 444, in which the reservoir fluid from the storage tank 204 flows with the power fluid into the throat 418. The power fluid and the reservoir fluid mix while flowing through the throat 418 towards the diffuser 420. In this example, a cross-sectional area of the diffuser 420 increases along the forward direction 442. Accordingly, a flow area increases as fluids (e.g., the power fluid and the reservoir fluid, mixed fluids, etc.) flow through the diffuser 420 and, thus, cause the fluids to increase in pressure and decrease in velocity through the diffuser 420. In such examples, the fluids exit the first aperture 416 and flow towards the header tank 202 at a relatively high pressure. As a result, the fluids entering the header tank 202 can increase a static pressure inside the header tank 202 to enable venting of vapor therefrom.

Figure 8:
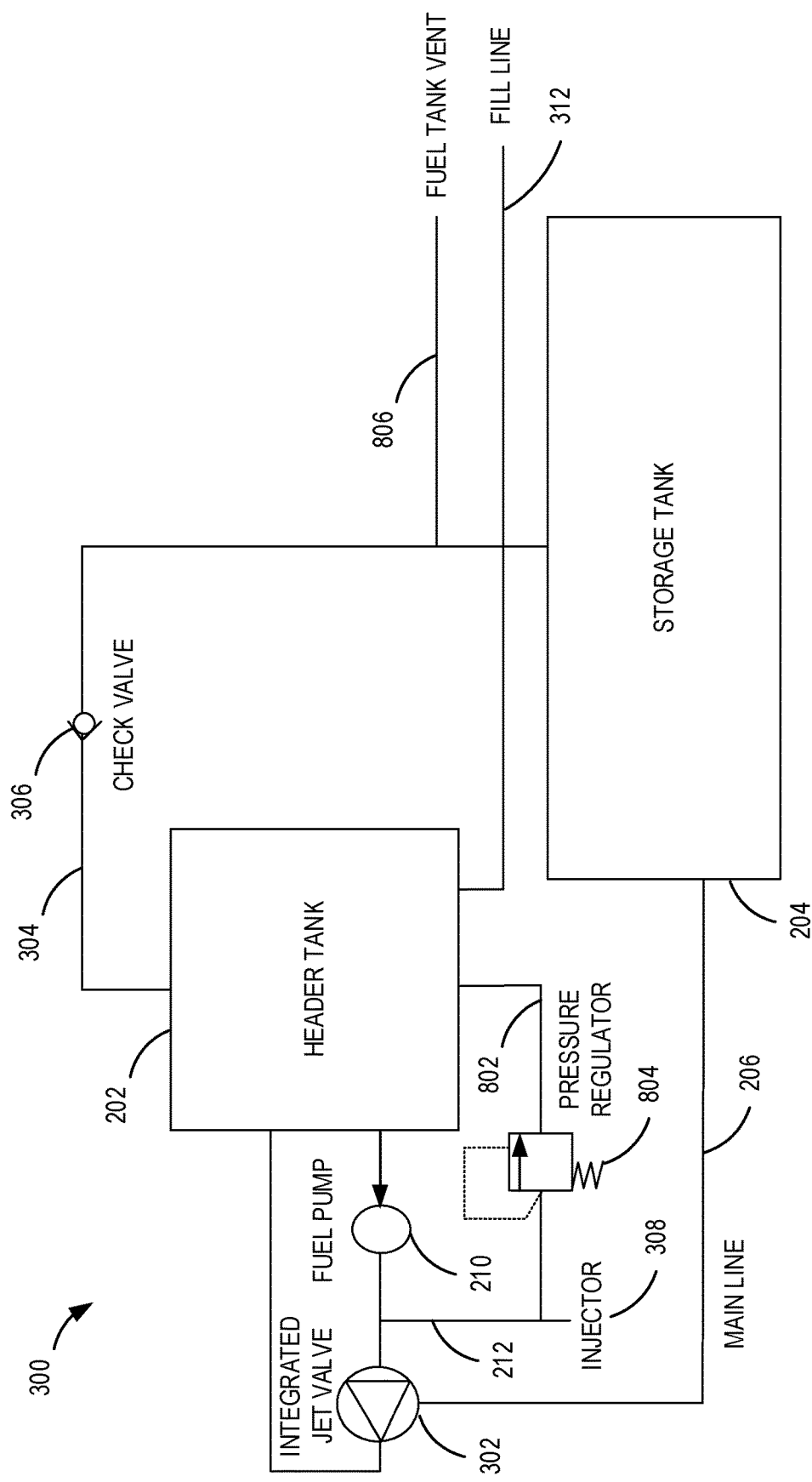
FIG. 8 is a fluid schematic of the example fuel system of FIG. 3 implementing the example jet valve of FIGS. 4-7.

FIG. 8 is a fluid schematic of the example fuel system 300 of FIG. 3 implementing the jet valve of FIGS. 4-7. In the illustrated example of FIG. 8, the fuel pump 210 is fluidly coupled to and external to the header tank 202. As such, during operation of the fuel pump 210, fluid flows from the header tank 202 to the fuel pump 210, and further flows from the fuel pump 210 to the injector 308 and/or to the jet valve 302. In this example, an example return line 802 is fluidly coupled between the high pressure fuel line 212 and the header tank 202, and an example pressure regulator 804 is implemented along the return line 802. The pressure regulator 804 is configured to regulate and/or maintain a desired pressure of the fluid flowing to the injector 308 and, thus, allows the injector 308 to perform efficiently.

In the illustrated example of FIG. 8, the fuel system 300 functions substantially as described above in connection with FIG. 3. In particular, during operation of the fuel pump 210, the jet valve 302 in the closed position provides pressurized fluid to the header tank 202. The pressurized fluid includes fluid from the fuel pump 210 and from the storage tank 204. In this example, provision of the pressurized fluid to the header tank 202 can be used to increase and/or maintain a static pressure in the header tank 202 (e.g., at around 1 psi). As a result of the header tank 202 being pressurized, vapor can be expelled from the header tank 202 via the vent line 304. Accordingly, the vapor can flow though the check valve 306 and toward the storage tank 204 (e.g., the check valve 306 prevents the vapor from returning to the header tank 202). In the illustrated example of FIG. 8, an example fuel tank vent 806 is fluidly coupled to the vent line 304 between the check valve 306 and the storage tank 204. In this example, the vapor expelled from the header tank 202 via the vent line 304 can flow to the storage tank 204 and/or can be vented to the atmosphere via the fuel tank vent 806.

In the illustrated example of FIG. 8, when the fuel pump 210 is shut off and/or operating below a threshold pressure, the jet valve 302 moves to the open position. In some examples, when the jet valve 302 is in the open position, fueling and/or defueling of the header tank 202 and storage tank 204 can occur. For example, during fueling, fluid is introduced to the header tank 202 via the fill line 312. In such examples, the fluid can flow to the storage tank 204 via the first fluid path 500 of FIG. 5. Conversely, during defueling, suction can be applied to the fill line 312 to draw and/or pull fluid from the storage tank 204 along the first fluid path 500. In particular, during fueling and/or defueling, the fluid does not fluid through a restricted flow area of the second fluid path 600 and, thus, can flow faster along the first fluid path 500 compared to the second fluid path 600.

Advantageously, the jet valve 302 in the open position enables efficient fueling and/or defueling of the header tank 202 and the storage tank 204. Further, the jet valve 302 in the closed position enables venting of vapor from the header tank 202 to prevent cavitation of the fuel pump 210. Additionally, the jet valve 302 is passively adjustable between the open and closed positions based on a pressure applied on the jet valve 302. As such, the jet valve 302 does not require actuation (e.g., by an operator and/or by an electronic control system) to move between the open and closed positions.

Figure 9:
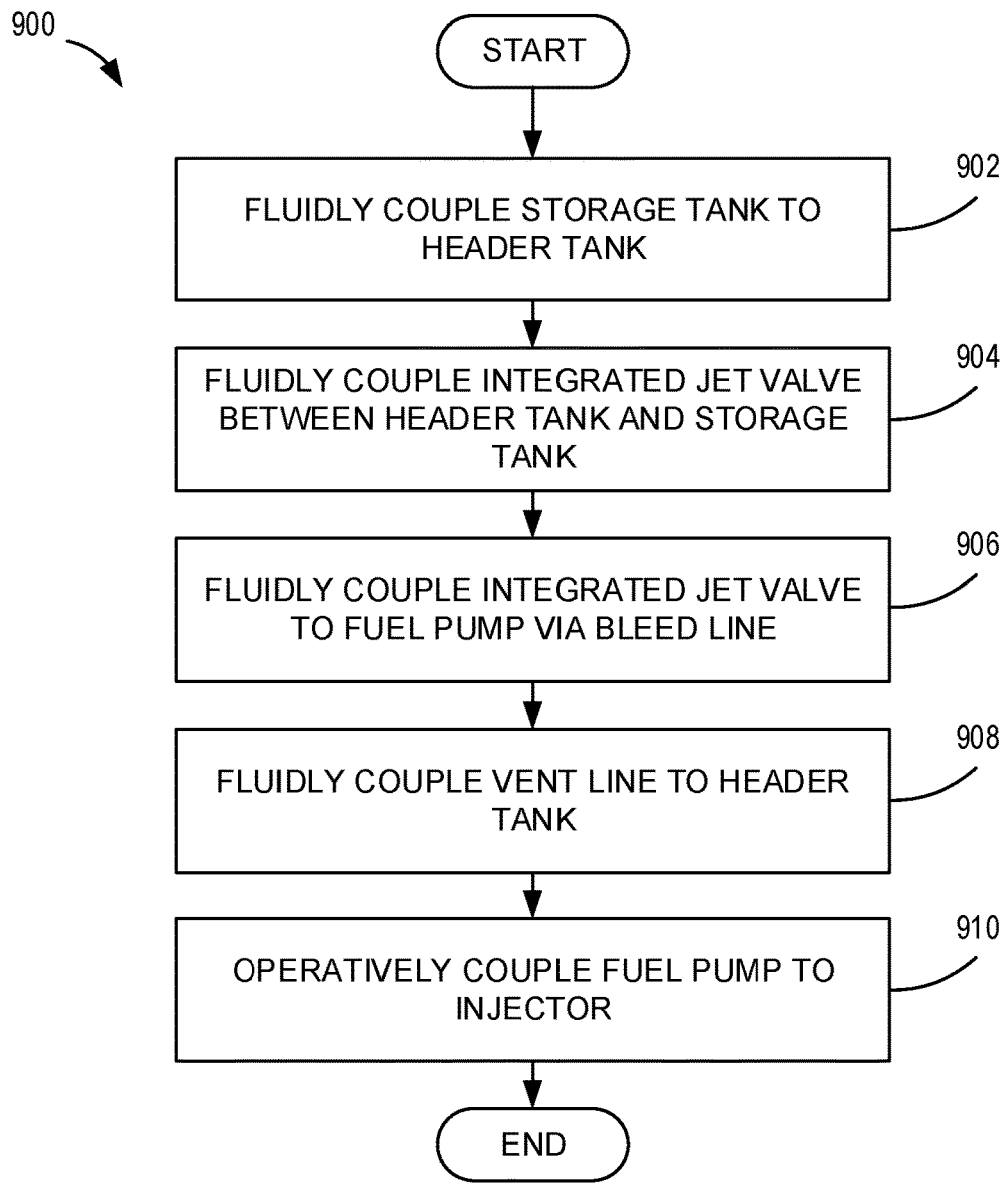
FIG. 9 is a flowchart representative of an example method to produce examples enclosed herein.

FIG. 9 is a flowchart representative of an example method 900 to produce examples enclosed herein. For example, the example method 900 can be executed to produce the fuel system 300 of FIGS. 3 and/or 8. The example method 900 of FIG. 9 begins at block 902, at which the storage tank 204 is fluidly coupled to the header tank 202. For example, the storage tank 204 and the header tank 202 are fluidly coupled via the main line 206.

At block 904, the jet valve 302 is fluidly coupled between the header tank 202 and the storage tank 204. In particular, the example jet valve 302 is fluidly coupled along the main line 206.

At block 906, the jet valve 302 is fluidly coupled to the fuel pump 210 via the bleed line 310.

At block 908, the vent line 304 is fluidly coupled to the header tank 202. For example, the vent line 304 is fluidly coupled to a top of the header tank 202 to allow vapor to flow therefrom. Additionally, in some examples, the check valve 306 is implemented along the vent line 304 to enable unidirectional flow away from the header tank 202.

At block 910, the fuel pump 210 is operatively and/or fluidly coupled to the injector 308.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that enable venting of vapor from a header tank and, thus, substantially prevent or reduce cavitation of a fuel pump inside the header tank. Further, examples disclosed herein enable fueling and defueling to occur along a main line between the header tank and a storage tank, thereby reducing mechanical complexity and weight of an aircraft fuel system.

Example 1 includes a jet valve to control flow of a fluid therethrough. The jet valve of Example 1 includes a valve body, a juncture operatively coupled to the valve body, the juncture having a first fluid connection fluidly coupled to a header tank and a second connection fluidly coupled to a storage tank, a spool movably disposed within the valve body, the spool having an aperture extending longitudinally therethrough, a spring operatively coupled between the spool and the valve body, and a jet pump fluidly coupled to a fuel pump of the header tank via a bleed line, the jet pump disposed within the aperture, where operation of the fuel pump pressurizes the bleed line and moves the spool to a first position to (i) close a first fluid path between the header tank and the storage tank and (ii) provide a second fluid path between the header tank and the storage tank, the second fluid path through the aperture, and depressurization of the bleed line enables the spring to move the spool to a second position to close the second fluid path and open the first fluid path.

Example 2 includes the jet valve of Example 1, where the spool includes a plug, the plug having a tapered shape to be sealably couplable to a complementarily shaped receptacle of the juncture when the spool is in the first position.

Example 3 includes the jet valve of any of Examples 1 or 2, where a cross-sectional area along the second fluid path is smaller than a corresponding cross-sectional area along the first fluid path.

Example 4 includes the jet valve of any of Examples 1 to 3, and further includes a throat and a diffuser defined within the aperture, the throat having a relatively constant cross-sectional area, the diffuser having an increasing cross-sectional area along a direction of the second fluid path.

Example 5 includes the jet valve of any of Examples 1 to 4, where the aperture is a first aperture, and further including a second aperture extending laterally through the spool, the second fluid path passing through the first aperture and the second aperture.

Example 6 includes the jet valve of Example 5, where a nozzle of the jet pump is positioned at an intersection of the first aperture and the second aperture.

Example 7 includes the jet valve of any of Examples 1 to 6, where the fuel pump is to be fluidly coupled to an injector of an aircraft engine.

Example 8 includes a system to control flow of a fluid therethrough. The system of Example 8 includes a storage tank, a header tank fluidly coupled to the storage tank, and an integrated jet valve fluidly coupled between the storage tank and the header tank, the integrated jet valve fluidly coupled to a fuel pump of the header tank via a bleed line, the integrated jet valve including a valve body, a juncture operatively coupled to the valve body, the juncture having a first fluid connection fluidly coupled to the header tank and a second connection fluidly coupled to the storage tank, a spool movably disposed within the valve body, the spool having an aperture extending longitudinally therethrough, a spring operatively coupled between the spool and the valve body, and a jet pump disposed within the aperture, where operation of the fuel pump pressurizes the bleed line and moves the spool to a first position to (i) close a first fluid path between the header tank and the storage tank and (ii) provide a second fluid path between the header tank and the storage tank, the second fluid path through the aperture, and depressurization of the bleed line enables the spring to move the spool to a second position to close the second fluid path and open the first fluid path.

Example 9 includes the system of Example 8, where the spool includes a plug, the plug having a tapered shape to be sealably couplable to a complementarily shaped receptable of the juncture when the spool is in the first position.

Example 10 includes the system of any of Examples 8 or 9, where a cross-sectional area along the second fluid path is smaller than a cross-sectional area along the first fluid path.

Example 11 includes the system of any of Examples 8 to 10, where the integrated jet valve further includes a throat and a diffuser defined within the aperture, the throat having a relatively constant cross-sectional area, the diffuser having an increasing cross-sectional area along a direction of the second fluid path.

Example 12 includes the system of any of Examples 8 to 11, where the aperture is a first aperture, the integrated jet valve further including a second aperture extending laterally through the spool, the second fluid path passing through the first aperture and the second aperture.

Example 13 includes the system of Example 12, where a nozzle of the jet pump is positioned at an intersection of the first aperture and the second aperture.

Example 14 includes the system of any of Examples 8 to 13, where the fuel pump is to be fluidly coupled to an injector of an aircraft engine.

Example 15 includes a method of producing a system for controlling flow of a fluid therethrough. The method of Example 15 includes fluidly coupling a storage tank to a header tank, fluidly coupling a jet valve between the storage tank and the header tank, and fluidly coupling the jet valve to a fuel pump of the header tank via a bleed line, the jet valve including a valve body, a juncture operatively coupled to the valve body, the juncture having a first fluid connection fluidly coupled to the header tank and a second connection fluidly coupled to the storage tank, a spool movably disposed within the valve body, the spool having an aperture extending longitudinally therethrough, a spring operatively coupled between the spool and the valve body, and a jet pump disposed within the aperture, where operation of the fuel pump pressurizes the bleed line and moves the spool to a first position to (i) close a first fluid path between the header tank and the storage tank and (ii) provide a second fluid path between the header tank and the storage tank, the second fluid path through the aperture, and depressurization of the bleed line enables the spring to move the spool to a second position to close the second fluid path and open the first fluid path.

Example 16 includes the method of Example 15, and further includes defining a throat and a diffuser within the aperture, the throat having a relatively constant cross-sectional area, the diffuser having an increasing cross-sectional area along a direction of the second fluid path.

Example 17 includes the method of any of Examples 15 or 16, where the aperture is a first aperture, further including providing a second aperture extending laterally through the spool, the second fluid path passing through the first aperture and the second aperture.

Example 18 includes the method of Example 17, and further includes positioning a nozzle of the jet pump at an intersection of the first aperture and the second aperture.

Example 19 includes the method of any of Examples 15 to 18, and further includes fluidly coupling a vent line to the header tank, and coupling a check valve onto the vent line, the check valve to enable unidirectional flow from the header tank.

Example 20 includes the method of any of Examples 15 to 19, and further includes fluidly coupling the fuel pump to an injector of an aircraft engine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A jet valve to control flow of a fluid therethrough, the jet valve comprising:
    a valve body;
    a juncture operatively coupled to the valve body, the juncture having a first fluid connection fluidly coupled to a header tank and a second connection fluidly coupled to a storage tank;
    a spool movably disposed within the valve body, the spool having an aperture extending longitudinally therethrough;
    a spring operatively coupled between the spool and the valve body; and
    a jet pump fluidly coupled to a fuel pump of the header tank via a bleed line, the jet pump disposed within the aperture, wherein:
        operation of the fuel pump pressurizes the bleed line and moves the spool to a first position to: (i) close a first fluid path between the header tank and the storage tank and (ii) provide a second fluid path between the header tank and the storage tank, the second fluid path through the aperture, and
        depressurization of the bleed line enables the spring to move the spool to a second position to close the second fluid path and open the first fluid path.

2. The jet valve of claim 1, wherein the spool includes a plug, the plug having a tapered shape to be sealably couplable to a complementarily shaped receptacle of the juncture when the spool is in the first position.

3. The jet valve of claim 1, wherein a cross-sectional area along the second fluid path is smaller than a corresponding cross-sectional area along the first fluid path.

4. The jet valve of claim 1, further including a throat and a diffuser defined within the aperture, the throat having a relatively constant cross-sectional area, the diffuser having an increasing cross-sectional area along a direction of the second fluid path.

5. The jet valve of claim 1, wherein the aperture is a first aperture, and further including a second aperture extending laterally through the spool, the second fluid path passing through the first aperture and the second aperture.

6. The jet valve of claim 5, wherein a nozzle of the jet pump is positioned at an intersection of the first aperture and the second aperture.

7. The jet valve of claim 1, wherein the fuel pump is to be fluidly coupled to an injector of an aircraft engine.

8. A system to control flow of a fluid therethrough, the system comprising:
    a storage tank;

a header tank fluidly coupled to the storage tank; and
an integrated jet valve fluidly coupled between the storage tank and the header tank, the integrated jet valve fluidly coupled to a fuel pump of the header tank via a bleed line, the integrated jet valve including:
  a valve body;
  a juncture operatively coupled to the valve body, the juncture having a first fluid connection fluidly coupled to the header tank and a second connection fluidly coupled to the storage tank;
  a spool movably disposed within the valve body, the spool having an aperture extending longitudinally therethrough;
  a spring operatively coupled between the spool and the valve body; and
  a jet pump disposed within the aperture, wherein:
    operation of the fuel pump pressurizes the bleed line and moves the spool to a first position to: (i) close a first fluid path between the header tank and the storage tank and (ii) provide a second fluid path between the header tank and the storage tank, the second fluid path through the aperture, and
    depressurization of the bleed line enables the spring to move the spool to a second position to close the second fluid path and open the first fluid path.

9. The system of claim 8, wherein the spool includes a plug, the plug having a tapered shape to be sealably couplable to a complementarily shaped receptable of the juncture when the spool is in the first position.

10. The system of claim 8, wherein a cross-sectional area along the second fluid path is smaller than a cross-sectional area along the first fluid path.

11. The system of claim 8, wherein the integrated jet valve further includes a throat and a diffuser defined within the aperture, the throat having a relatively constant cross-sectional area, the diffuser having an increasing cross-sectional area along a direction of the second fluid path.

12. The system of claim 8, wherein the aperture is a first aperture, the integrated jet valve further including a second aperture extending laterally through the spool, the second fluid path passing through the first aperture and the second aperture.

13. The system of claim 12, wherein a nozzle of the jet pump is positioned at an intersection of the first aperture and the second aperture.

14. The system of claim 8, wherein the fuel pump is to be fluidly coupled to an injector of an aircraft engine.

15. A method of producing a system for controlling flow of a fluid therethrough, the method comprising:
  fluidly coupling a storage tank to a header tank;
  fluidly coupling a jet valve between the storage tank and the header tank; and
  fluidly coupling the jet valve to a fuel pump of the header tank via a bleed line, the jet valve including:
    a valve body;
    a juncture operatively coupled to the valve body, the juncture having a first fluid connection fluidly coupled to the header tank and a second connection fluidly coupled to the storage tank;
    a spool movably disposed within the valve body, the spool having an aperture extending longitudinally therethrough;
    a spring operatively coupled between the spool and the valve body; and
    a jet pump disposed within the aperture, wherein:
      operation of the fuel pump pressurizes the bleed line and moves the spool to a first position to: (i) close a first fluid path between the header tank and the storage tank and (ii) provide a second fluid path between the header tank and the storage tank, the second fluid path through the aperture, and
      depressurization of the bleed line enables the spring to move the spool to a second position to close the second fluid path and open the first fluid path.

16. The method of claim 15, further including defining a throat and a diffuser within the aperture, the throat having a relatively constant cross-sectional area, the diffuser having an increasing cross-sectional area along a direction of the second fluid path.

17. The method of claim 15, wherein the aperture is a first aperture, further including providing a second aperture extending laterally through the spool, the second fluid path passing through the first aperture and the second aperture.

18. The method of claim 17, further including positioning a nozzle of the jet pump at an intersection of the first aperture and the second aperture.

19. The method of claim 15, further including:
  fluidly coupling a vent line to the header tank; and
  coupling a check valve onto the vent line, the check valve to enable unidirectional flow from the header tank.

20. The method of claim 15, further including fluidly coupling the fuel pump to an injector of an aircraft engine.

* * * * *